United States Patent [19]
Porter et al.

[11] 3,747,344
[45] July 24, 1973

[54] VARIABLE NOZZLE AREA CONTROL SYSTEM

[75] Inventors: Russell W. Porter; John C. Riley, both of Cincinnati, Ohio

[73] Assignee: General Electric Company, Cincinnati, Ohio

[22] Filed: July 20, 1970

[21] Appl. No.: 56,367

[52] U.S. Cl. .................................................. 60/242
[51] Int. Cl. ............................................. F02k 1/18
[58] Field of Search ........................ 60/242, 238, 239

[56] References Cited
UNITED STATES PATENTS
3,331,204   7/1967   Love ................................... 60/238
2,971,326   2/1961   Peters et al. ......................... 60/242

*Primary Examiner*—Carlton R. Croyle
*Assistant Examiner*—Robert E. Garrett
*Attorney*—Derek P. Lawrence, Thomas J. Bird, Jr., Lee H. Sachs, Frank L. Neuhauser, Oscar B. Waddell and Joseph B. Forman

[57] ABSTRACT

A control system for a jet engine variable area nozzle includes means for selectively generating a first or a second temperature reference signal in response to engine throttle lever position and nozzle area for effective control of engine operating temperatures and to enhance maximum augmented engine thrust.

4 Claims, 3 Drawing Figures

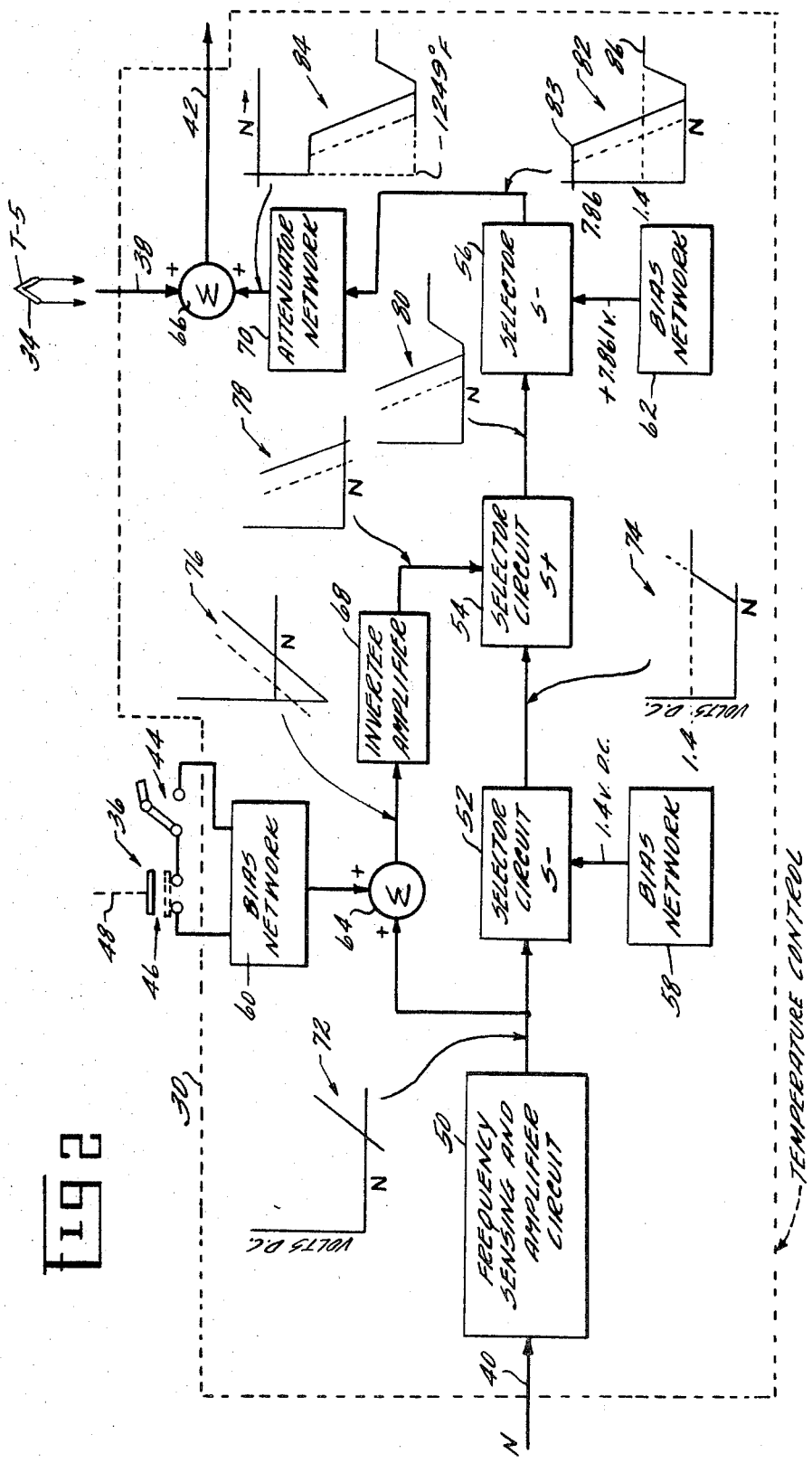

VARIABLE NOZZLE AREA CONTROL SYSTEM

This invention relates to control systems for jet engines and, more particularly, to a variable area nozzle control system for afterburning or augmented jet engines.

Aircraft jet engines commonly include an air compressor for pressurizing incoming air, combustion apparatus for burning fuel with the compressed air and generating a hot gas stream, a turbine for extracting energy from the hot gas stream to drive the compressor, an afterburner for increasing the energy of the hot gas stream downstream of the turbine, and a variable area nozzle through which the hot gas stream is discharged to produce propulsive thrust. The variable area nozzle is usually controlled manually as a function of engine throttle position or angle and means are provided to either bias or override the manual control as a function of selected engine operating parameters so as to ensure that engine operating temperatures are within safe limits and to prevent a stall condition from occurring in the engine compressor due to increased back pressures.

In U.S. Pat. No. 2,706,383, assigned to the assignee of this application, a variable area nozzle control arrangement is shown which includes means to override the manual nozzle area schedule in response to a temperature error signal which represents the difference between the actual turbine discharge temperature or exhaust gas temperature (T-5), and a constant temperature reference signal.

In U.S. Pat. No. 2,931,168, assigned to the assignee of this application, there is shown an afterburning jet engine having manual means for controlling nozzle throat area which is biased by a temperature error signal, with the error signal representing the difference between the actual turbine discharge temperature (T-5) and a temperature reference signal which varies as a fixed function of the temperature of incoming air to the compressor (T-2).

More recently, it has been the practice to provide means to override the throttle responsive manual schedule in response to a temperature error signal which represents the difference between T-5 and a temperature reference signal which varies as a fixed function of engine rotor speed (N).

While such prior nozzle area control arrangements are effective in maintaining steady state and transient engine operation below the engine stall and maximum exhaust gas temperature lines, by using either a constant temperature reference signal or a temperature reference signal that varies as a fixed function of T-2 or N, available engine thrust is compromised during some operating modes.

It is therefore an object of the present invention to provide means for controlling nozzle area in a manner resulting in minimum compromise to maximum available engine thrust while preserving adequate stall and temperature margin.

Another object of this invention is to provide an improvement for nozzle area control systems of the type adapted to control T-5 by means of a temperature error signal representing the difference between a measured T-5 and a temperature reference signal whereby maximum augmented engine thrust may be increased without compromising stall margin and temperature margin during transient or unaugmented engine operation.

Briefly stated, the above and other objects and advantages of the present invention are achieved by providing means for resetting a temperature reference signal, used to control T-5 via nozzle position, to permit a higher T-5 and hence increased engine thrust. Switching means are provided to effect reset in response to predetermined conditions of the throttle lever and nozzle area so as to prevent reset from occurring during engine transients. A temperature control means for generating the temperature reference and error signals includes a bias network operative to generate a first bias voltage in response to an open condition of the switching circuit means and a second bias voltage in response to a closed condition of the switching circuit means. The first bias voltage produces a first temperature reference signal and the second bias voltage effects reset or a second temperature reference signal.

While the specification concludes with claims particularly pointing out and distinctly claiming the subject matter of this invention, it is believed that the invention will be better understood upon reading the following description of the preferred embodiment taken in connection with the drawings, wherein:

FIG. 2 is a schematic of an exemplary temperature control means for producing the first and second temperature reference signals of this invention.

Figure 1:
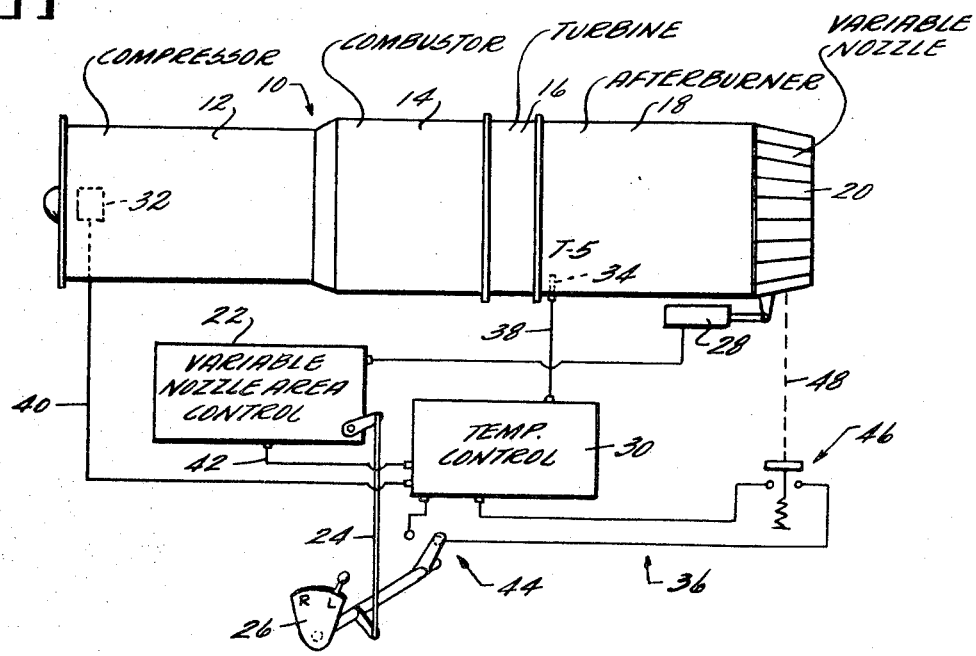
FIG. 1 is a schematic representation of a jet engine having a variable area nozzle and employing the improved nozzle control system of this invention.

Referring now to FIG. 1 of the drawings, a jet engine has been diagrammatically shown at 10 as comprising a compressor 12, a combustor 14, a turbine 16 for receiving the hot gas stream generated by the combustor and driving the compressor 12, an afterburner 18 for increasing the energy of the hot gas stream, and a variable area exhaust nozzle 20 through which the hot gas stream effluxes to produce propulsive thrust.

The control system for nozzle 20 has been schematically shown as comprising a nozzle area control means 22 operatively connected at 24 to an engine throttle lever 26; actuator means 28 for positioning the nozzle 20 in response to the nozzle area control means 22; temperature control means 30; engine rotor speed sensing means, such as an alternator 32; temperature sensing means, such as one or more thermocouples 34; and, a switching circuit means 36.

Thermocouples 34 sense the exhaust gas temperature (T-5) and supply a proportional millivolt signal to the temperature control means 30 through a connection 38. Likewise, alternator 32 supplies a frequency signal proportional to the engine rotor speed to temperature control means 30 through a connection 40. The temperature control means 30 generates a temperature error signal representing the difference between an internally generated temperature reference signal and T-5, and delivers said error signal to the area control means 22 through a connection 42. The area control means 22 directs actuator means 28 to appropriately open or close the nozzle area in response to the throttle lever position input and the magnitude and polarity of the temperature error signal. In this manner and in accordance with prior practice, the nozzle area is manually controlled by the position of throttle lever 26 through a scheduled cam (not shown) of the area control means 22, with the nozzle area further appropriately opened or closed by the nozzle area control means 22 in response to the temperature error signal so as to effectively control T–5 for optimum steady state performance and stall margin.

In accordance with the present invention, the temperature control means 30 is further adapted to reset the temperature reference signal or generate a second temperature reference signal in response to a closed condition of switching means 36 so as to increase the thrust output of the engine 10 at one or more selected engine operating points without precipitating an overtemperature condition or engine stall.

In one form, switching means 36 comprises a throttle lever position switch 44 and nozzle position switch 46 connected in series, with the nozzle position switch 46 operably connected, as at 48, to the nozzle 20 so as to close in response to a nozzle throat area at or above a predetermined minimum and open in response to a nozzle area below said predetermined minimum area. The throttle position switch 44 is operatively connected to throttle lever 26 and arranged to close in response to a maximum augmented or afterburning throttle setting.

Referring now to FIG. 2, an exemplary temperature control means 30 has been schematically shown as including an amplifier circuit means 50; selector circuit means 52, 54 and 56; biasing networks 58, 60 and 62; summing circuits 64 and 66; an inverter amplifier 68; and an attenuating network 70.

While the foregoing circuit elements are known in the art and will, therefore, not be described in detail herein, a brief description of their cooperative relationship in the exemplary temperature control means 30 of FIG. 2 and their function in that relationship follows.

In operation, circuit means 50 is adapted to receive the engine rotor speed signal (N) and generate a signal, as at 72, the voltage of which varies as a function of N. Signal 72 and a constant voltage from bias network 58 are delivered to selector circuit 52 which selects and outputs the lowest input as at 74.

The bias network 60 generates a first biasing voltage in response to an open condition of switching circuit means 36 and a second biasing voltage in response to a closed condition of switching circuit means 36. Such first or second bias voltage and the output signal 72 of means 50 are combined by summing means 64, as at 76, with the open condition of switching means 36 being indicated as a solid line and the closed condition being indicated by the broken line. The foregoing convention will be used hereinafter to distinguish between the open and closed conditions of switching circuit means 36.

The output signal 76 of summing means 64 is delivered to inverter amplifier means 68 for 90° signal rotation and further amplification so as to produce first or second signal 78.

Signals 74 and 78 are delivered to selector circuit means 54 which is adapted to select the greater of signal 74, signal 78 and zero volts and generate a first or second signal as at 80. A fixed biasing voltage, higher than that of biasing means 58, and first or second signal 80 are delivered to selector means 56 which selects the most negative voltage of the received signals and generates a first or second signal as at 82, with the flat 83 of such signals having been established by the input voltage of bias means 62 and the flat 86 of such signals being established by the input voltage of bias means 58.

The attenuator network 70 receives the first or second signal 82 and generates the first or second temperature reference signal 84 for comparison with the signal from temperature sensing means 34. Stated another way, attenuator network 70 reduces the magnitude signal 82 to the millivolt levels of the T–5 signal and appropriately shifts the signal 82.

The T–5 signal from the temperature sensing means 34 and the first or second temperature reference signal 84 are algebraically combined by summing means 66.

As will be recognized, the first and second temperature reference signals are shaped as described above so as to define the desired maximum allowable T–5 at any given engine rotor speed (N).

To the extent that the manually scheduled control of nozzle area results in a T–5 which is above the desired temperature, as defined by the selected temperature reference signal 84, a temperature error signal is generated by summing means 66 and delivered to the nozzle area control means 22 through connection 42. In response to such an error signal, the nozzle area control means directs actuator means 28 to appropriately open or close nozzle 20 which reduces or increases the back pressure on the turbine and thereby decreases or increases T–5.

Figure 3:
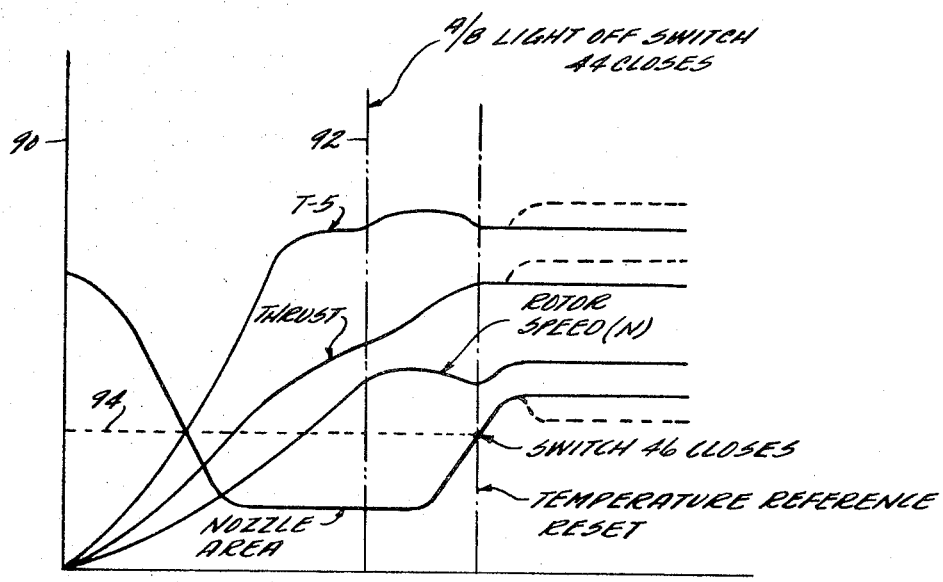
FIG. 3 is a graph showing exemplary operating curves for the engine of FIG. 1.

Referring now to FIG. 3, typical transient engine operating curves have been shown from engine idle to maximum augmented, with the effect of the temperature reference signal reset of this invention on such operation being indicated by the broken line portion of each curve. The engine throttle lever conditions of idle and maximum augmented have been indicated by the vertical lines 90 and 92, respectively, while the predetermined minimum area, below which switch 46 opens, has been indicated at 94.

From the curves of FIG. 3 it will be seen that the temperature reference signal reset of this invention provides higher engine thrust in the maximum augmented engine operating mode without compromising engine temperature and stall margins during lower power settings or engine transients that occur, for example, at afterburner lightoff. In this regard, the predetermined minimum nozzle area indicated at 94 is preferably selected so as to ensure that transients associated with afterburner lightoff have subsided before switch 44 closes.

While an exemplary electronic temperature control means 30 has been schematically depicted for generating a first or second temperature reference signal 84 in response to an open or closed condition of switching circuit means 36, and for comparing the selected signal with a signal representing the actual exhaust gas temperature, it will be appreciated by those skilled in the art that such signals may be established using other electrical arrangements, mechanical arrangements or combinations thereof.

Further, while the present invention is particularly effective in increasing maximum augmented engine thrust, it will be recognized that it may be effectively employed to reset the temperature reference signal during other engine operating modes by appropriately shifting other portions of that signal, as by applying a switching means 36 to biasing network 58 or 62.

Accordingly, while a preferred embodiment has been depicted and described, it will be appreciated that many modifications and variations may be made thereto without departing from the fundamental theme of this invention.

What is claimed is:

1. In a jet engine variable area exhaust nozzle control system of the type including an engine throttle lever for manually controlling nozzle area through a nozzle area control means, said area control means being further responsive to a temperature error signal for varying said nozzle area to control engine temperature, temperature control means for generating a first variable temperature reference signal as a function of at least one variable of engine operation, means for sensing an operating temperature of said engine and generating a proportional signal, said temperature control means further adapted to generate said temperature error signal as a function of the difference between said temperature reference signal and said operating temperature signal, the improvement comprising:

means for resetting said first variable temperature reference signal to thereby generate a second variable temperature reference signal during selected portions of operation of said engine to enhance output thrust without degradation of transient engine stall and temperature characteristics, said reset means including switching circuit means having a throttle responsive switch and a nozzle area responsive switch connected in series, said throttle responsive switch being arranged to close in response to a particular setting of said throttle lever and said nozzle area responsive switch being arranged to close at and above a predetermined minimum nozzle area corresponding to stabilized engine operation at said particular throttle setting.

2. The improved exhaust nozzle control system of claim 1 further characterized in that said temperature control means and said reset means include means for generating a first bias voltage in response to an open condition of said switching circuit means and a second bias voltage in response to a closed condition of said switching means, said temperature control means producing said first temperature reference signal in response to said first bias voltage and said second temperature reference signal in response to said second bias voltage.

3. The improvement of claim 2 further characterized in that said engine includes an afterburner, with said throttle responsive switch being arranged to close in response to a maximum augmented setting of said throttle lever and said nozzle area responsive switch being arranged to close at and above a predetermined minimum nozzle area corresponding to stabilized augmented engine operation after afterburner lightoff.

4. The improvement of claim 3 further characterized in that one said variable of engine operation is engine speed, with said operating temperature being the exhaust gas temperature.

* * * * *